May 23, 1961 A. C. GIESSELMAN 2,985,755

COMMUNICATION SYSTEM

Filed May 27, 1957 3 Sheets-Sheet 1

INVENTOR.
ALBERT C. GIESSELMAN
BY [signature]
ATTORNEY

CONTROL NETWORK 12

INVENTOR.
ALBERT C. GIESSELMAN
BY [signature]
ATTORNEY.

May 23, 1961 A. C. GIESSELMAN 2,985,755

COMMUNICATION SYSTEM

Filed May 27, 1957 3 Sheets-Sheet 3

INVENTOR.
ALBERT C. GIESSELMAN

BY George V. Eltgroth

ATTORNEY

United States Patent Office 2,985,755
Patented May 23, 1961

2,985,755

COMMUNICATION SYSTEM

Albert C. Giesselman, Syracuse, N.Y., assignor to General Electric Company, a corporation of New York Filed May 27, 1957, Ser. No. 661,821

8 Claims. (Cl. 250—20)

This invention relates to communication systems and more particularly to communication systems which include mobile and fixed units.

In certain communication systems such as those employed along roadways, waterways or pipelines, mobile radio units travel along the length of the system. These mobile units usually operate at relatively short wavelengths such as those in the FM (frequency modulation) communication bands. For reliable communication, this type of transmission is usually limited to line of sight. Further, due to mobility the power of transmission is relatively low which also limits the signal range. To compensate for the limited range of communication, several receivers are placed along the "backbone" of the system. Each receiver serves as a relay link to retransmit the signals either via wire or radio waves back to a central headquarters.

These fixed receivers are usually assigned a predetermined priority of retransmission. The priorities are assigned in an order related to the relative reliability of the intervening circuits such as microwave channels and repeater paths. For example, the receiver whose circuit to the central headquarters is least likely to fail or whose signal to noise ratio is the best is assigned the highest priority. Thus, when several relaying channels are used, the top priority receiver relays the signal.

However, if an intermediate station of a multiple station receiver network is assigned top priority and the mobile unit is nearer one end of the network, it is more likely that one of the receivers near the end of the network is receiving a much stronger signal than the assigned top priority receiver. Thus, the purpose of the priority system is defeated.

While attempts have been made to provide communication systems which automatically relayed only the strongest signal, these systems have generally proved to be unreliable.

It is therefore a specific object of the invention to provide an improved communication system of the type which employs mobile units and a plurality of fixed station receivers in which the fixed station receiver which receives the strongest signal is automatically selected.

It is another object of the invention to provide an improved mobile communication system using several fixed station receivers as possible relay links to a central station in which an order of priority is assigned to the fixed station receivers.

It is a further object of the invention to provide an improved communication system which although governed by a priority system can bypass the priority system when a low priority receiver is more favorably located with respect to the mobile transmitter.

A more general object of the invention is to provide an improved communication system which is particularly reliable.

In accordance with one embodiment of the invention, apparatus is provided for insuring a more reliable communication system between a mobile transmitter and a central station. The apparatus includes several fixed receiving stations or base receivers. Each of the base receivers is capable of receiving a signal from a mobile transmitter and relaying the signal along a channel to the central station. Associated with each base receiver is a control element which is operative a period of time after the start of reception. The period of time is inversely proportional to the magnitude of the signal received from the mobile transmitter by the associated base receiver. A control network is provided to determine the priority of the base receivers. The control network is responsive to the first operating control element so that signals from the base receiver associated with the first operating control element are relayed back to the central station while signals from the other base receivers are prevented from being received by the central station.

An advantage of the invention is that as long as the signals received by several of the base receivers are equal in magnitude, the fixed priority system governs the selection of the base receiver in accordance with general reliability. But, when the amplitude of signals received by each of the base receivers is different, the fixed priority system is overruled to favor the base receiver receiving the strongest signals so as to again provide the most reliable transmission to the central station.

A feature of the invention is the control element associated with each of the base receivers. The control element senses the amplitude of the incoming signal to establish a delay period before the actuation of a switching device. At the end of the delay period, which starts at the time of receipt of the mobile unit signal, the switching device is actuated and generates control functions that are fed to a control network to open one retransmission path and close all others.

A feature of the control element is a stability device which prevents the control element from being affected by spurious and transient changes in amplitude of the carrier signal being received.

Other objects, features, and advantages of the invention will be apparent from the following detailed description which is accompanied by drawings, in which:

Figure 1 shows a mobile communication system in block diagram form, in accordance with a preferred embodiment of the invention, including base receivers and associated control elements, the control network, and central station, Figure 2 is a schematic diagram of the control network shown in Figure 1 and comprises a relay logical network in which those portions encompassed by dotted lines are parts of control elements physically located in the base receivers (Fig. 1) but are also shown to more clearly indicate their control functions, and Figure 3 shows one of the base receivers of Figure 1 and, in particular, schematically illustrates the associated control element including portions of the base receiver that are directly concerned with the operation of the control element.

*General system description (Fig. 1)*

A mobile communication system in accordance with the preferred embodiment of the invention is shown in Figure 1. The mobile communication system generally comprises a plurality of mobile units each including a transmitter such as the mobile transmitter 8, a plurality of base receivers 10 such as the base receivers 10*a*–10*d*, a control network 12 and a central station 14. The mobile transmitter 8 may be a conventional mobile FM transmitter. Each of the base receivers 10 includes an FM receiver 15 and a control element 17.

The mobile transmitter 8 may be in any moving vehicle such as an automobile, truck, railroad car, boat or airplane. The plurality of base receivers 10*a*–10*d* are spaced along the route.

The FM receiver 15 receives information signals from the mobile transmitter 8. The control element 17, which includes a carrier energized relay and variable delay means, initiates control functions after a period of time which is proportional to the strength of the signal received from the mobile transmitter 8. The control network 12 is primarily a switching matrix responsive to the control functions initiated by the control elements 17 in the base receivers 10 to establish transmission paths for the information signals received by the base receivers 10. The central station 14 receives the best information signal via the control network 12. When the information signals are audio signals, the central station 14 may be a speaker or earphones.

In the drawing, for purpose of clarity, all information signal paths are indicated by lines with double arrowheads and all control signal lines are indicated by lines with single arrowheads.

Each base receiver 10*a*–10*d* is coupled to the control network 12 via an associated information line 20*a*–20*d* while the control network 12 is coupled to the central station 14 by corresponding information lines 22*a*–22*d*. The control network 12 also receives control functions from the control elements 17*a*–17*d* of the corresponding base receivers 10*a*–10*d* in general along the associated control lines 24, 26, 28 and 30.

When the occupant of the mobile unit wishes to make voice contact with the central station 14, which may be an operational headquarters, a frequency modulated carrier is transmitted from the mobile transmitter 8. One or more of the base receivers 10 receives this carrier. In general, each base receiver 10 will pick up a signal of different amplitude since the signal strength is dependent on the proximity of the mobile transmitter 8 to the base receiver 10. In any case, all base receivers 10 sensing a carrier above a certain threshold level are alerted by self-contained carrier energized relays which cause the priming of the variable delay means. At the same time, the limiter portions of the FM receivers 15 in the associated base receivers 10 are also energized. The degree of energization of each limiter portion is related to the amplitude of the signal received and therefore functions as a signal amplitude sensing means. The variable delay means of the control element 17 in the base receiver 10 which is activated (as determined by the amount of energization of its limiter) generates a control function that is fed via the control lines 24, 26, 28 and 30 to the control network 12. The first control function permits the information signal from the associated base receiver 10 to pass via an information line 20 through the control network 12 to the central station 14 via an information line 22.

For example, assume that the base receiver 10*b* receives the strongest signals from the mobile transmitter 8. The control element 17*b* will operate first and control functions will be fed via the control lines 24*b*, 26*b*, 28*b* and 30*b* to the control network 12. These control functions cause switching in the control network 12 to permit the transfer of audio signals fed from the base receiver 10*b* via the information line 20*b* through the control network 12 and to the central station 14 via the information line 22*b*.

*Control network (Figs. 1 and 2)*

The control network 12 shown in Figure 1, which is responsive to the control functions of the base receivers 10 for switching the information lines to the central station 14, is a relay matrix (Fig. 2) for performing switching logic. It should be noted that although relays are shown as the logical elements in Figure 2, solid state or electronic tube elements may also be used. Further, while the control functions shown are the making or breaking of circuits, other control functions may be used such as voice-frequency tones, D.C. control voltages, or pulse insertion on a time division multiplex system.

It should also be noted that the relay elements indicated by dotted blocks are physically located in the base receivers 10, but are shown in connection with the relay matrix of the control network 12 to more clearly explain their control functions. These relay elements are preferably either tone operated switches or microwave termination-unit relay elements located at the central station 14 and respond to a control function initiated at each base receiver 10. Thus, only one control line is required from each base receiver 10.

These relay elements are contacts of what may be called voting relays. The voting relay contacts comprise a pair of normally open contacts 25 and 27 and a pair of normally closed contacts 29 and 31. The control network 12 also includes two banks of four relays in which each of the relays in the first bank has a coil 40, a pair of normally open contacts 41 and 42, and a pair of normally closed contacts 43 and 44, while each of the relays in the second bank has a coil 50, a first pair of normally closed contacts 51 and 52 and a second pair of normally closed contacts 53 and 54. A relay supply 60 is provided to supply energizing current for the coils of the relays of both banks.

The control network 12 is designed so that a fixed priority is assigned to the base receivers 10. If all base receivers 10 receive an equal amplitude signal, then the base receiver 10*a* (Fig. 1) is connected to the central station 14. Second priority is assigned to the base receiver 10*b*, third priority to the base receiver 10*c*, and fourth priority to the base receiver 10*d*.

The following example illustrates the operation of the priority system. Assume that the base receivers 10*a* and 10*b* each receive signals of the same amplitude, and base receivers 10*c* and 10*d* receive signals of lower amplitude. Voting relays of the control elements 17*a* and 17*b* are energized at the same time. Therefore, the normally open contacts 25*a* and 27*a* (Fig. 2) of the voting relay in the control element 17*a* will close while the normally closed contacts 29*a* and 31*a* of this voting relay will open. Simultaneously, the identical operation occurs to the corresponding contacts of the voting relay of the control element 17*b* of the base receiver 10*b*. However, the shorting of the contacts 25*a* and 27*a* connect the coil 40*a* across the relay power supply 60 while the opening of the relay contacts 29*a* and 31*a* prevent any of the remaining coils 40*b*, 40*c* and 40*d* from receiving any energizing current. Therefore, the coil 40*a* is energized and its normally open contacts 41*a* and 42*a* are closed while its normally closed contacts 43*a* and 44*a* are opened. This action connects the coils 50*b*, 50*c* and 50*d* of the second bank of relays across the relay power supply 60 and at the same time prevents energizing current from flowing through the coil 50*a*. With the coil 50*a* unenergized, its normally closed first pair of contacts 53*a* and 54*a* remain shorted and the input line 20*a* from the base receiver 10*a* is coupled through these shorted contacts and via the output line 22*a* to the central station 14. However, the energization of the coils 50*b*, 50*c* and 50*d* causes the opening of their associated normally closed contacts 53 and 54 to break any connection between the base receivers 10*b*, 10*c* and 10*d* with the central station 14.

Thus, it has been shown that when equal amplitude signals are received by two base receivers 10, one of which is the base receiver 10*a*, the base receiver 10*a* has top priority.

If, however, different amplitude signals are received by the base receivers 10, that base receiver receiving the strongest signal is coupled to the central station 14 regardless of the established priority. This operation is dependent upon the time of energization of the voting relays of the control elements 17.

Assume that the base receiver 10 which receives the strongest signals has its associated voting relay contacts actuated first. If now the base receivers 10a, 10b and 10c all receive signals from the mobile transmitter 8 but the strength of the received signals is such that base receiver 10c receives the strongest signals, the voting relay contacts of the base receiver 10c are actuated first. An energizing current path is established from the relay supply 60 via the still closed contacts 29a and 31a, the still closed contacts 29b and 31b, the now closed contacts 25c and 27c, and the still closed contacts 51c and 52c, through the coil 40c and back to the relay supply 60. It should be noted that no other energizing paths to the remaining coils of the first relay bank are yet established. With the coil 40c energized, its normally open contacts 41c and 42c are closed while its normally open contacts 43c and 44c are opened resulting in the energizing of only the coils 50a, 50b and 50d of the second bank of relays. The energizing of these coils causes the opening of all their normal closed contacts. In particular, the opening of the contacts 53a and 54a breaks the connection between the information lines 20a and 22a. A similar operation occurs to break the connection between the information lines 20b and 22b.

At the same time, an inhibitory operation occurs as follows: The first pair of normally closed contacts 51a and 52a are opened by the energizing of the coil 50a to break any energizing path for the coil 40a which until now was solely dependent on the closing of the contacts 25a and 27a. This applies, likewise, for the coil 40b because of the opening of the normally closed contacts 51b and 52b. Thus, even when the voting relay contacts of the control elements 17a and 17b of the base receivers 10a and 10b are finally actuated, they are ineffective.

Of course, there is a finite pickup time for the relays so the time spacing between the operation of control elements 17 in the base receivers 10 must be greater than a minimum value. However, the functional relationship between signal strength and control element actuation is such that if the time spacing between operation of the different control elements 17 is too narrow, the difference in received signal strength is not critical.

*General description of the base receivers (Figs. 1 and 3)*

The base receiver 10 shown in Figure 1 each comprise an FM receiver 15 and a control element 17. Each of the base receivers 10a–10d includes the same FM receiver 15. The control elements 17a–17c are exactly the same. However, base receiver 10d, since it has the lowest priority, does not require control signal lines 28 and 30 and associated contacts on the voting relay.

One of the control elements 17a–17c will be described by way of example.

The control element 17 (Fig. 3) includes the carrier energized relay 68, the vacuum tube triodes 90 and 98, the voting relay 123 and the delay control 141. All of the control elements 17 except the carrier energized relay 68 may be termed variable delay means.

Briefly, each control element 17 operates in the following manner:

The triode vacuum tube 90 functions as a D.C. amplifier and is responsive to a negative signal from the limiter grid return of the FM receiver 15 to provide a corresponding amplified signal of positive polarity. Since the amplitude of the negative signal is related to the amplitude of the carrier signal received by the FM receiver 15, the amplitude of the amplified signal is directly proportional to the strength of the carrier signal.

The triode vacuum tube 98 functions as the voting relay control tube. When the triode vacuum tube 98 conducts, the voting relay 123 is energized to feed the associated audio information signal and control function to the control network 12 (Fig. 1) via the information signal line 20 and the control signal lines 24, 26, 28 and 30 respectively. The triode vacuum tube 98 (Fig. 3) is primed to conduct by energization of the carrier energized relay 68.

As was indicated above, the base receiver 10, which initiates the control function first, causes the audio information signals from the remaining base receivers 10 to be blocked at the control network 12 so that only the audio information signal from the base receiver 10 which generates the first control function is passed to the central station 14 (which functions as a receiving means). In other words, the received signal which is the strongest is the only signal which is fed to the central station 14.

Conduction of the triode vacuum tube 98 and therefore operation of the voting relay 123 is dependent on the potential of the control grid of the triode vacuum tube 98. This control grid is coupled to the anode of the triode vacuum tube 90 via the delay control 141. Means are provided (in the absence of a received carrier signal) to produce a voltage drop across the delay control 141. The potential at the control grid of the triode vacuum tube 98 is the difference between this voltage drop and the anode potential of the triode vacuum tube 90. Since the circuit parameters are chosen so that the voltage drop is greater than the anode potential of the triode vacuum tube 90, the control grid potential of the triode vacuum tube 98 is negative and thus the triode vacuum tube 98 cannot conduct to energize the voting relay 123.

However, when the base receiver 10 receives a carrier signal, a corresponding positive signal appears at the anode of the triode vacuum tube 90 which is directly proportional to the signal strength of the received signal. Therefore, the time between the receipt of the carrier signal and the raising of the control grid of the triode vacuum tube to conduction potential is dependent on the amplitude of the anode voltage of the triode vacuum tube 90 and the rate of discharge of the delay control 141. That is, since the potential at the control grid of the triode vacuum tube 98 is the difference between the voltage drop across the delay control 141 and the anode voltage of the triode vacuum tube 90 and since the voltage drop is greater, the more positive the anode voltage the faster the difference will reach the control grid conduction potential.

Therefore, since the delay control 141 is the same in each of the control elements 17a–17d, the voltage drop across each of the delay controls 141 is the same. Further, each of the delay controls 141 has the same time constants so that the rates of discharge are the same. Thus, the voting relay 123 of the control element 17 whose anode of triode vacuum tube 90 has the highest potential will be energized first.

Therefore, the base receiver 10 which receives the strongest carrier signal will be the first to generate the control functions which determine that its audio signal will be the only audio signal fed to the central station 14.

Further, since the components of the R.-C. network which comprise the delay control 141 may be particularly precise, the rate of charging and discharging of the capacitors which carry the charge producing voltage can be fixed with precision to insure that these time constants are substantially the same for each base receiver 10. This in turn insures that a very precise comparison is made between the signal strength of the carrier signals received by the base receiver 10.

The above method of initiating a control function a predetermined time after the receipt of a signal which is inversely proportional to the amplitude of the received signal may be briefly stated as follows: establishing a voltage charge (i.e., a charge producing voltage) which can be decreased at a fixed rate, producing a potential which is proportional to the amplitude of the received signal and initiating discharge of the voltage charge upon receipt of the signal, and initiating a control function when a predetermined relationship occurs between the potential and the decreasing voltage charge.

*Detailed description of base receivers (Fig. 3)*

Figure 1:
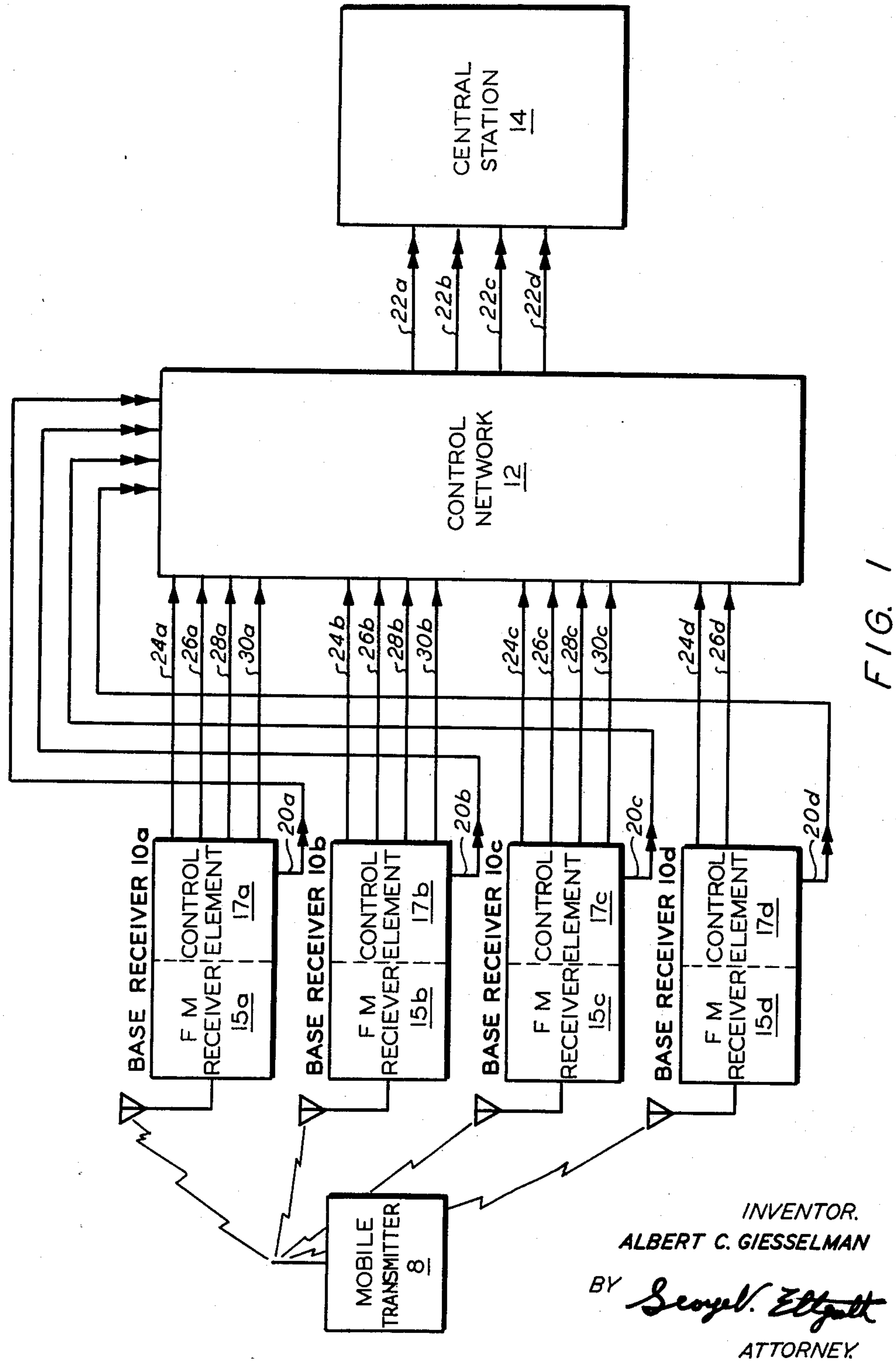
Figure 2:
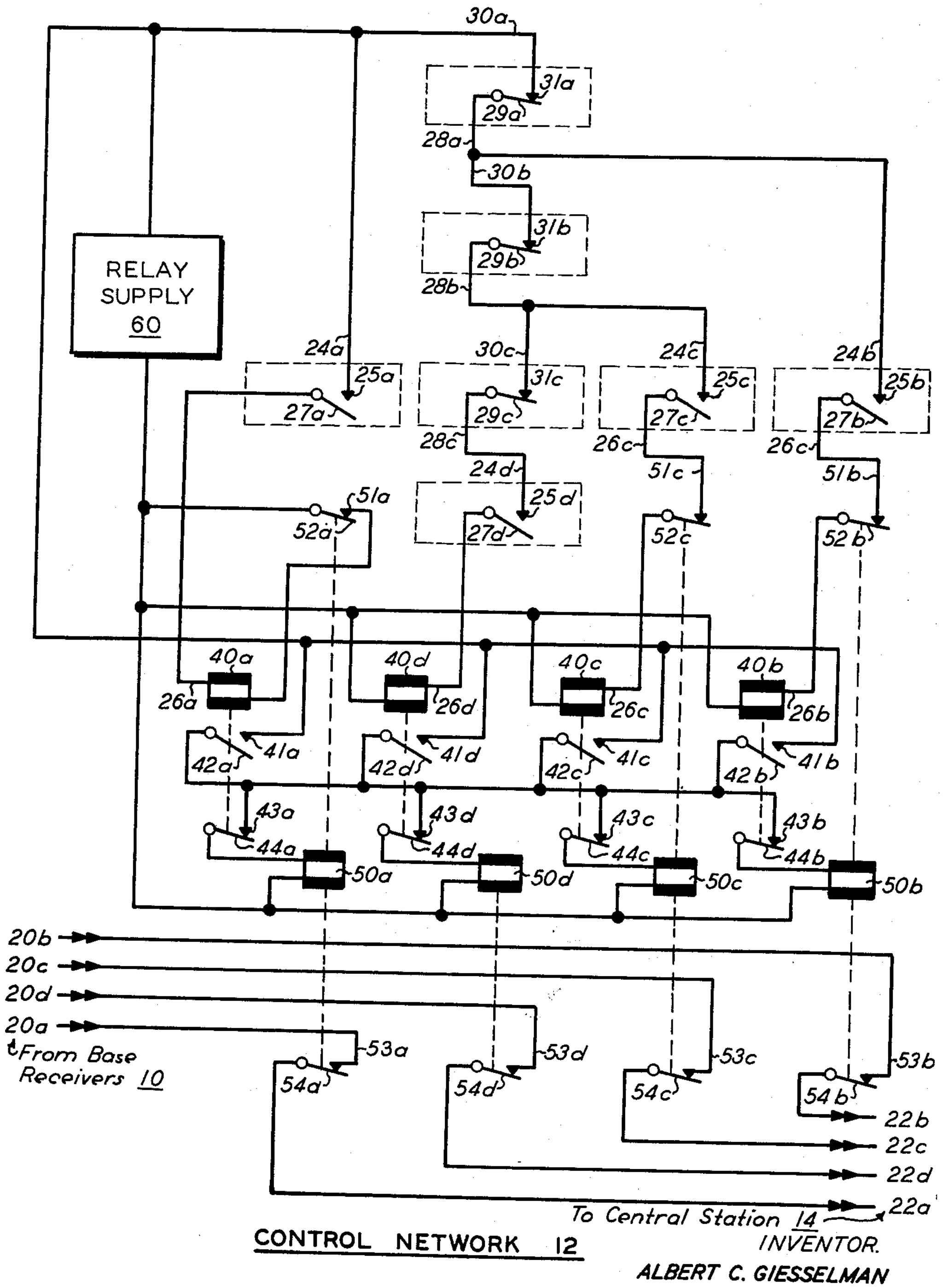
Figure 3:
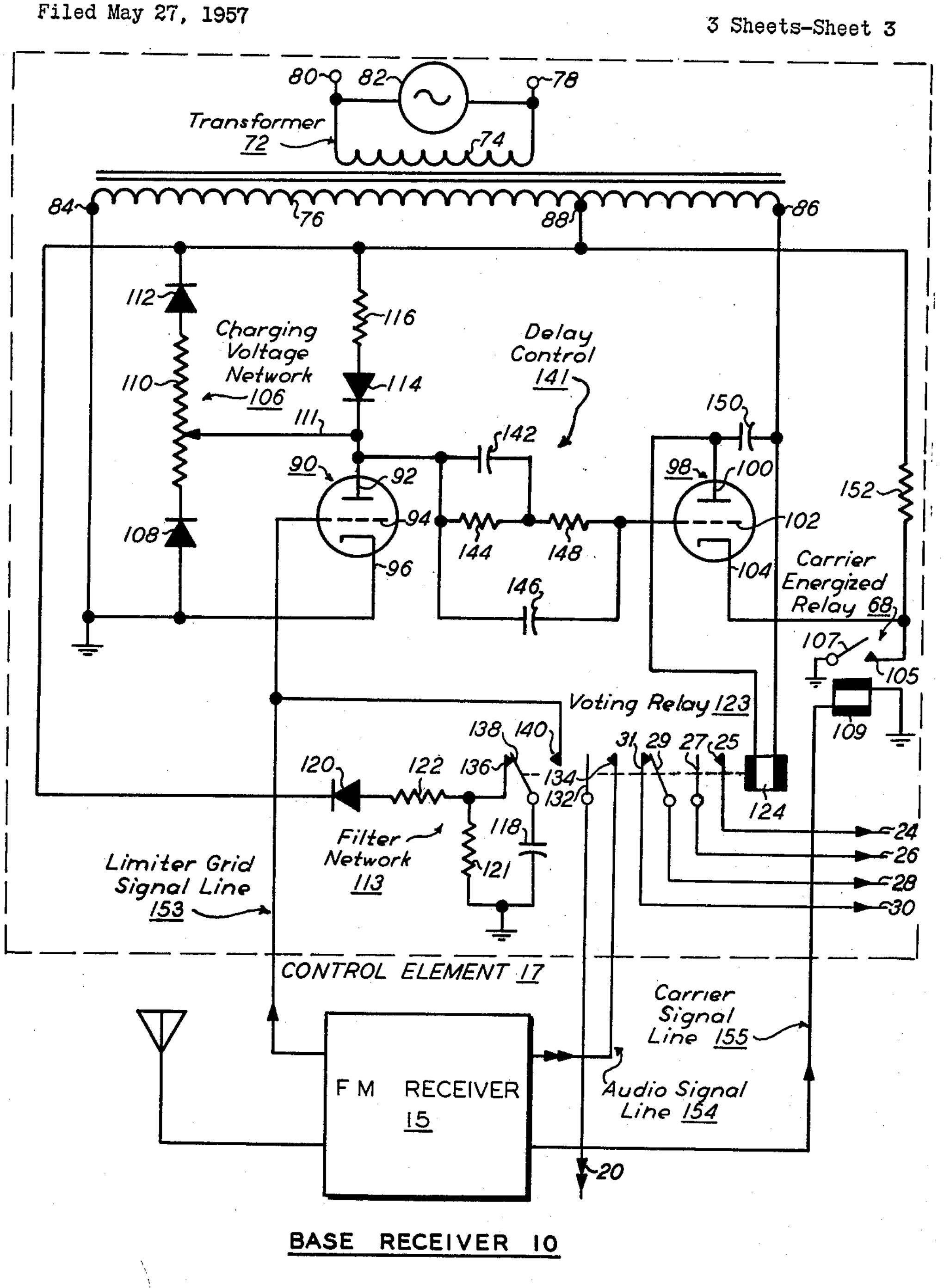

The base receiver 10 shown in Figure 3 comprises the FM receiver 15 and the control element 17. The FM receiver 15 may be a conventional receiver such as General Electric type ER–25–B. The control element 17 comprises the carrier energized relay 68, the transformer 72, the triode vacuum tubes 90 and 98, the charging voltage network 106, the filter network 113, the voting relay 123 (which includes contacts 25, 27, 29 and 31 also shown in dotted blocks in Fig. 2), the delay control 141 and associated circuitry.

The transformer 72 comprises the primary winding 74 and the secondary winding 76. Leads 78 and 80 of the primary winding 74 are connected across a conventional 117 volt 60 cycle voltage source 82. The secondary winding 76 includes the leads 84 and 86 and the tap 88.

Triode vacuum tube 90 comprises an anode 92, a control grid 94, and a cathode 96 which is grounded. A load for the triode vacuum tube 90 is provided consisting of the series connected diode 114 and the resistor 116. One end of the resistor 116 is connected to tap 88 and the other end is connected to the anode of the diode 114. The cathode of the diode 114 is connected to the anode 92 of the triode vacuum tube 90. The grid 94 of the triode vacuum tube 90 is coupled to the FM receiver 15.

The charging voltage network 106 is composed of diode 108, a potentiometer 110, and a diode 112 in series relation with the cathode of the diode 108 connected to one end of the potentiometer 110 and the anode of the diode 112 connected to the other end of the potentiometer 110. The cathode of the diode 112 is coupled to the tap 88 and the anode of the diode 108 is connected to lead 84 of the transformer 72. The slider 111 of the potentiometer 110 is connected to the anode 92 of the triode vacuum tube 90.

The filter network 113 is provided for the control grid 94 of the triode vacuum tube 90 and comprises the capacitor 118 and the resistor 121 which are coupled together and connected to ground. The other ends of capacitor 118 and resistor 121 are respectively connected to contacts 138 and 136 respectively of the voting relay 123. A charge establishing means for the capacitor 118 is provided comprising the serially connected diode 120 and the resistor 122 in series relation with one end of the resistor 122 connected to the contact 136 and the other end connected to the anode of the diode 120. The cathode of the diode 120 is connected to tap 88 of the transformer 72.

The triode vacuum tube 98 comprises the anode 100, the control grid 102 and the cathode 104. The anode 92 of the triode vacuum tube 90 is coupled to the control grid 102 of the triode vacuum tube 98 via the delay control 141.

The delay control 141 is composed of the capacitor 142 in parallel with the resistor 144, and also in series with the resistor 148. Capacitor 146 is in parallel with this series-parallel combination. Resistor 148 decouples capacitor 142 and resistor 144 from the control grid 102 of triode vacuum tube 98, so that the time constant of the capacitor 142-resistor 144 combination is not seriously affected by the operating condition of the control grid 102. Capacitor 146 reduces the A.C. ripple introduced at the control grid 102 of triode vacuum tube 98, due to the high impedance of the grid circuit.

The voting relay 123 is of the polarized type and has one end of its coil 124 coupled to the lead 86 of the transformer 72 and the other end of its coil 124 coupled to the anode 100 of the triode vacuum tube 98. The capacitor 150 is in parallel with the coil 124. The cathode 104, which may be coupled to ground via contacts 105 and 107 of the carrier energized relay 68, is connected to tap 88 of transformer 72 via resistor 152. The coil 109 of the carrier energized relay 68 is connected between ground and the carrier signal line 155 which couples carrier signal from the FM receiver 15 to the carrier energized relay 68.

The voting relay 123 includes the first pair of normally open contacts 25 and 27 and a pair of normally closed contacts 29 and 31 (also shown in dotted blocks in Fig. 2), and a set of transfer contacts 136, 138 and 140 (Fig. 3) with a moving contact 138 normally shorted to the contact 136 and a second pair of normally open contacts 132 and 134. The fixed contact 25 is coupled to control line 24 while the moving contact 27 is coupled to control line 26. The moving contact 29 is connected to the control line 28 while the fixed contact 31 is connected to the control line 30. The fixed contact 134 is linked via the audio line 154 to the audio output of the FM receiver 15. The moving contact 132 is coupled to information line 20.

The detailed operation of the base receiver 15 and control element 17 of Figure 3 is as follows:

With no carrier being received the carrier energized relay 68 is open and the cathode 104 of the triode vacuum tube 98 is coupled via the resistor 152 to the tap 88 of the transformer 72.

During the half cycle when the tap 88 is at a lower potential than the lead 84, current flows through the diodes 108 and 112 of the charging voltage network 106 to effectively connect potentiometer 110 across lead 84 and tap 88 to establish a negative potential with respect to ground at the anode 92 of the triode vacuum tube 90. However, since the carrier energized relay 68 is deenergized and contacts 105 and 107 are open, the cathode 104 of the triode vacuum tube 98 is even more negative since it is connected via resistor 152 (which has a relatively low resistance) to the tap 88, and a charging path from the slider 111 of the potentiometer 110, via the delay control 141 and the control grid 98 to the cathode 104, is established so that the capacitors 142 and 146 of the delay control 141 are charged. In this condition the triode vacuum tube 98 side of the delay control 141 is more negative than the triode vacuum tube 90 side. Also during this half cycle the capacitor 118 is charged to a negative potential with respect to ground by tap 88 via a path comprising the diode 120, the resistor 122 and the closed contacts 136 and 138. By a suitable choice of resistance values the negative potential established is equal to the potential established in the limiter of the FM receiver 15 when minimum threshold signals are received. (It should be noted that, although during the next half cycle these charged capacitors tend to discharge, there is a replenishment of charge on the succeeding half cycle.)

During the next half cycle, the cycle during which both the tap 88 and the lead 86 swing positive with respect to the lead 84 which is grounded, the triode vacuum tubes 90 and 98 are capable of conduction. Since there is a minimum bias on control grid 94 because the voltage on the limiter grid signal line 153 is relatively positive, the triode vacuum tube 90 conducts and the anode 92 assumes a low positive potential. However, because of the charge established on the capacitors 142 and 146 and the low potential of the anode 92 of the triode vacuum tube 90, the triode vacuum tube 98 is biased below cut off.

Until the carrier energized relay 68 is energized there is a dynamic charging and discharging of the capacitors 142 and 146. However, by the proper choice of size of these capacitors and associated resistors of delay control 141, time constants are obtained which permit a rapid charge and a slow discharge so that the bias on the triode vacuum tube 98 does not reach the conduction region during positive half cycles. The values of the components of the delay control 141 are selected in accordance with the following principles:

For reliable operation, this over-all R-C network should have a time-constant in the order of two (2) seconds. Resistor 148 should be at least twice as large as resistor 144 to provide good isolation for the capacitor 142 and resistor 144. Also, resistor 144 and resistor 148 must be selected such that resistor 144 is a significant portion of the series combination of resistors 110, 144, 148, 152 and the grid to cathode forward diode resistance of triode vacuum tube 98. Time constants should be an order of magnitude greater than the sixty cycle period.

When a sufficiently strong carrier is received and the carrier energized relay 68 is energized, the cathode 104 of the triode vacuum tube 98 is connected to ground. Thus, when the tap 88 and the lead 86 now swing below ground causing the potential of anode 92 of the triode vacuum tube 90 to drop, the control grid 102 of the triode vacuum tube 98 also drops in the usual manner but the cathode 104 remains at ground potential and there is no charging path via the control grid 102 and cathode 104. Therefore, during the next positive half cycle less charge must be leaked before the control grid 102 reaches the conduction region. In addition, since carrier signal is being received, the negative signal received from the limiter along the line 153 is greater and the triode vacuum tube 90 conducts less freely. Its anode 92 is therefore at a higher potential tending to raise the potential of the control grid 102. Both of these effects, the higher anode potential of triode vacuum tube 90 and the unreplenished charge of the capacitors 142 and 146, shorten the time required for the triode vacuum tube 98 to conduct.

If several of the base receivers 10 receive a carrier signal, then their associated carrier energized relays 68 close and their capacitors 142 and 146 are denied replenishment. But, since the magnitude of the carrier received will be different for each base receiver 10, the negative potential assumed by their limiters will be different. The limiter of the base receiver 10 receiving the strongest signal will be most negative and consequently the control grid to cathode voltage of its triode vacuum tube 90 will be most negative. Therefore, its anode 92 will be most positive and the degree of discharge and therefore the time required before the related triode vacuum tube 98 conducts is less.

When triode vacuum tube 98 conducts, current flows through the coil 124 to energize the voting relay 123. When the voting relay 123 is energized, the contacts 132 and 134 are shorted connecting the audio output of the FM receiver 15 via the audio line 154 to the information line 20; the contacts 25 and 27 are shorted and the contacts 29 and 31 opened to perform the control function heretofore described in detail.

At the same time, the contact 138 is transferred from the contact 136 to the contact 140 and the capacitor 118 is connected to the limiter line 153 coupled to the limiter of the FM receiver 15. This capacitor which has been charged to a potential approximately equal to the limiter potential serves as a smoothing means to filter out any transients that may occur from temporary change or loss of carrier signal.

Thus, a novel control element has been provided in accordance with a feature of the invention which has a variable delay means that is a function of the amplitude of the carrier signal received by a base receiver in a mobile communication system. Further, rapid fluctuations in carrier strength do not affect the operation of the system.

The following are representative values of the components employed in a specific embodiment of the control element 17 and are given by way of example only:

| | |
|---|---|
| Diode **108** | GE 1N93. |
| Diode **112** | GE 1N93. |
| Diode **120** | GE 1N93. |
| Triode vacuum tube **90** | ½ 12AT7. |
| Triode vacuum tube **98** | ½ 12AT7. |
| FM receiver **15** | GE ER-25-B. |
| Transformer **72** | Stancor PS8416. |
| Primary voltage of transformer **72** | 117 v. R.M.S. |
| Secondary voltage of transformer **72** | 250 v. R.M.S. |
| Tap **88** voltage with respect to end **84** | 125 v. R.M.S. |
| Potentiometer **110** | 100,000 ohms. |
| Resistor **116** | 82,000 ohms. |
| Resistor **121** | 5,600 ohms. |
| Resistor **122** | 68,000 ohms. |
| Resistor **144** | 510,000 ohms. |
| Resistor **148** | 1,600,000 ohms. |
| Resistor **152** | 10,000 ohms. |
| Capacitor **118** | 50 microfarads. |
| Capacitor **142** | .47 microfarad. |
| Capacitor **146** | .47 microfarad. |
| Capacitor **150** | .47 microfarad. |

*Conclusion*

Therefore, in accordance with the invention, an improved mobile communication system has been provided for relaying the best signal received by several receivers. The system is particularly reliable since it includes a precise means for comparing the relative signal strengths at various receiver locations. Further, means are provided for insuring reliable operation although the carrier signal strength of the mobile unit may fluctuate rapidly.

There will now be obvious to those skilled in the art many modifications and variations utilizing the principles set forth and realizing many or all of the objects and advantages, but which do not depart essentially from the spirit of the invention.

What is claimed is:

1. In a system providing for the selective connection of one of a plurality of base receivers each having a signal amplitude sensing means to an audio line in response to signals transmitted from a mobile transmitter, a control element in each base receiver comprising a relay control unit having an input and an output, a relay coupled to the output of said relay control unit, said relay connecting its associated base receiver to the audio line while blocking the remaining base receivers, a resistance-capacitance network coupled to the input of said relay control tube, a charging means for establishing a charge on said resistance-capacitance network, an amplifier having an input and an output, the output of said amplifier being connected to said resistance-capacitance network, and the input of said amplifier being coupled to said signal amplitude sensing means such that the potential at the input of said relay control unit is a function of the amplitude of signals received from said mobile transmitter and the rate of discharge of said resistance-capacitance network.

2. In a system providing for the selective connection of one of a plurality of base receivers each having a signal amplitude sensing means to an audio line in response to signals transmitted from a mobile transmitter, a control element in each base receiver comprising a relay control tube having an anode, a control grid and a cathode, a relay connected to the anode of said relay control tube, said relay when activated connecting its respective base receiver to the audio line while blocking the remaining base receivers, a resistance-capacitance network coupled to the control grid of said relay control tube, a charging means for establishing a charge on said resistance-capacitance network, a direct current amplifier having an anode, a control grid and a cathode, the anode of said direct current amplifier being connected to said resistance-capacitance network, and the control grid of said direct current amplifier being coupled to said signal amplitude sensing means such that the conduction of said relay control tube and therefore the activation of said relay is a function of the amplitude of signals received from said mobile transmitter and the rate of discharge of said resistance-capacitance network.

3. In the system according to claim 2, said resistance-capacitance network comprising a first resistor and a second resistor connected in series relation, a first capacitor in parallel with said first resistor and said second resistor, and a second capacitor in parallel with said first resistor.

4. In the system according to claim 3, a filter means for filtering the signals fed from said signal amplitude sensing means.

5. A communication system comprising a plurality of receivers adapted to receive signals varying in amplitude and of a fixed frequency, a plurality of selectively actuated signal transmission channel means one coupled to each of said receivers for transmitting received signals from said receivers to a common utilization means, control means coupled to each of said receivers for generating a control function in response to the amplitudes of the received signals including time delay circuit means for actuating said control means after a period of time varying inversely with the amplitude of the received signal, channel selecting means coupled to said individual control means for selectively establishing one of said transmission channels upon receipt of a control function for transmitting one of said received signals to said common utilization means while simultaneously disabling the remaining channels so that the signal from the receiver with the strongest signal is transmitted to the common utilization means.

6. The communication system of claim 5 wherein said channel selecting means includes a control network for assigning a fixed channel selecting priority and further means responsive to the receipt of a control function for over-riding said fixed priority and selecting the channel transmitting the strongest signal.

7. A communication system comprising a plurality of receivers adapted to receive signals of a fixed frequency and of varying amplitudes, a plurality of selectively actuated transmission channels one coupled to each of said receivers for transmitting the signals received at said receivers to a common utilization means, control means coupled to each of said receivers for generating a control function in response to the amplitude of the received signals including a variable timing circuit for disabling said control means for a predetermined time varying inversely with the amplitude of the signals, said timing ciruit being coupled to its associated receiver and being energized therefrom, channel selecting means coupled to said individual control means for selectively establishing one of said transmission channels upon receipt of a control function for transmitting one of said received signals to said common utilization means while simultaneously disabling the remaining channels.

8. The communication system of claim 7 wherein said channel selecting means includes a control network for assigning a fixed channel selecting priority, and further means for over-riding said fixed priority and selecting the channel transmitting the strongest signal.

References Cited in the file of this patent

UNITED STATES PATENTS

| | | |
|---|---|---|
| 1,922,059 | Ohl | Aug. 15, 1933 |
| 2,292,222 | Haigis | Aug. 4, 1942 |
| 2,572,912 | Bucher | Oct. 30, 1951 |
| 2,737,578 | Bartelink | Mar. 6, 1956 |
| 2,870,326 | Steiner | Jan. 20, 1959 |